Dec. 3, 1935.   H. S. JANDUS ET AL   2,023,077
AUTOMOBILE BUMPER
Filed March 31, 1933
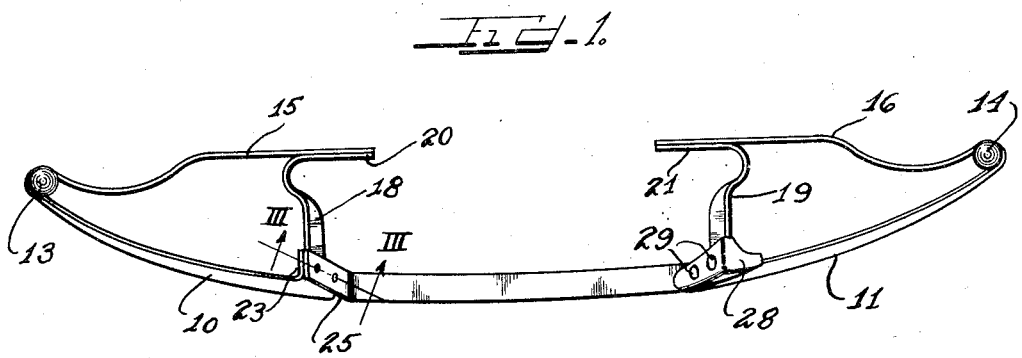
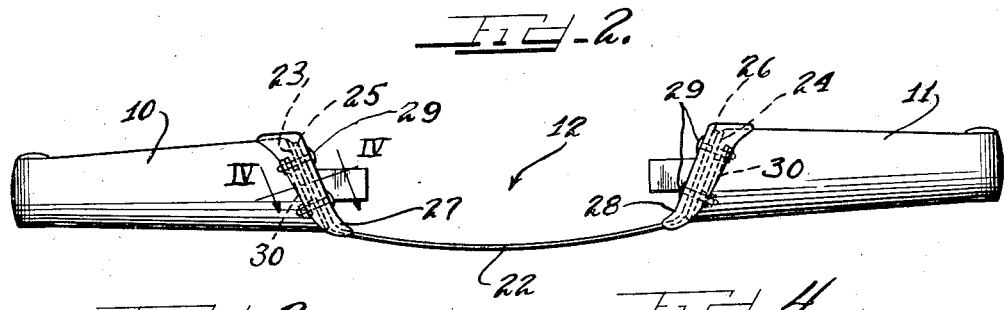
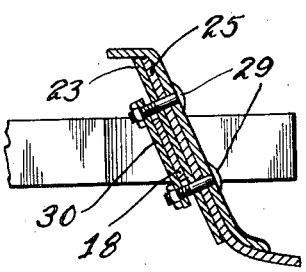
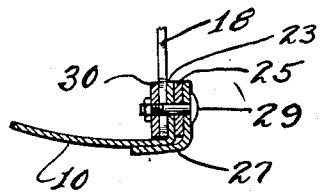
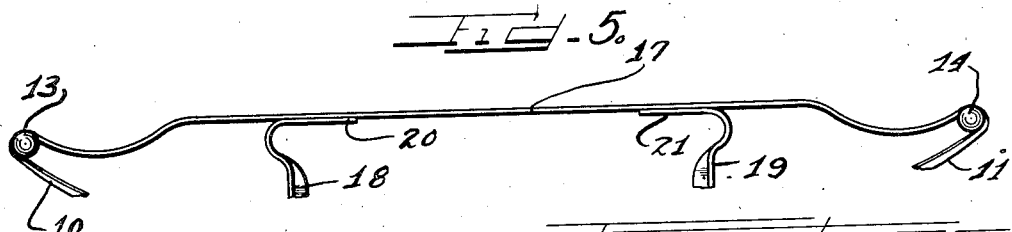
Inventors
Herbert S. Jandus.
Bladen M. Short.
by Charles H. Fields  Atty.

Patented Dec. 3, 1935

2,023,077

UNITED STATES PATENT OFFICE 2,023,077

AUTOMOBILE BUMPER

Herbert S. Jandus and Bladen M. Short, Detroit, Mich., assignors to General Spring Bumper Corporation, Detroit, Mich., a corporation of Michigan Application March 31, 1933, Serial No. 663,678

5 Claims. (Cl. 293—55)

This invention relates to an automobile bumper and more particularly to a multi-section bumper in which a gap is provided centrally of the bumper so as to enable a more extensive front view of the radiator.

With the advent of the automobile with the sloping front radiator it became especially desirable to provide a bumper which would afford a minimum amount of obstruction to the front view of the radiator. It is accordingly the aim of this invention to provide a bumper having multi-impact bar sections with a centrally disposed gap between them and opposite the radiator whereby a minimum amount of obstruction to a view of the automobile radiator is afforded.

An object therefore of this invention is to provide an improved automobile bumper which will fulfill the above discussed requirements.

Another object of the invention is to provide a multi-impact bar section bumper of simple construction but yet of sufficient rigidity and stability to withstand the shock and strain to which the bumper may be exposed in use.

In accordance with the general features of this invention there is provided an automobile bumper including impact bar sections on opposite sides of the automobile radiator and with a central gap between them to enable a more extensive as well as a substantially unobstructed front view of the radiator.

Another feature of the invention relates to the provision of a novelly arranged tie-bar between the impact bar sections of our bumper.

A still further feature of the invention relates to the provision of a bumper with novel clamps or closures for connecting the opposite extremities of the impact bar sections to the other parts, including the tie-bar, of the bumper.

Other objects and features of this invention will more fully appear from the following detailed description taken in connection with the accompanying drawing and in which Figure 1 is a plan view of a bumper embodying the features of this invention and in which one of the enclosing clamps has been omitted so as to more clearly illustrate the manner in which each impact bar section is connected to the other parts of the bumper;

Figure 2 is a front view of the bumper shown in Figure 1;

Figure 3 is an enlarged fragmentary sectional view taken on the line III—III of Figure 1 looking in the direction indicated by the arrows;

Figure 4 is an enlarged fragmentary cross-sectional view taken on the line IV—IV of Figure 2 looking downwardly; and Figure 5 is a view of a fragmentary part of a modified form of bumper in which a single back bar is provided which extends the full length of the bumper.

The reference characters 10 and 11 indicate front or impact bar sections between which there is a central gap to provide a substantially unobstructed front view of the automobile radiator to the rear of the bumper. This central gap is designated generally by the reference character 12.

The outermost extremities of the impact bar sections 10 and 11 terminate in pivot or hinge barrels 13 and 14 which may be of any suitable or conventional construction. These two barrels also have hingedly connected to them back bars 15 and 16 disposed opposite the impact bar sections 10 and 11 respectively. It should be noted at this time that while in the preferred form of the invention we have illustrated the bumper as being provided with two spaced back bars 15 and 16, such bars may be formed into a single bar such as the bar 17 shown in Figure 5 without departing from the spirit and scope of this invention.

The impact bar sections 10 and 11 are also connected to the back bar structure irrespective of whether it be a two piece back bar or a single piece back bar by means of twisted braces 18 and 19 disposed intermediate the ends of the bumper. These braces are twisted and bent in such a manner that their rear ends 20 and 21 respectively lie substantially in the plane of the back bars 15—16 or the back bar 17. The ends 20—21 of the two braces 18 and 19 may be secured in any suitable manner to the back bar structure and may be connected directly to the support members on the automobile to which the bumper is adapted to be anchored.

The gap 12 between the impact sections 10 and 11 is bridged by a tie-bar 22 which is disposed in substantially a horizontal plane, or, in other words, in a plane substantially at right angles to the vertical plane of the impact bar sections 10 and 11.

The inner ends of the impact bar sections 10 and 11 are turned inwardly as indicated at 23 and 24 respectively. These turned ends 23 and 24 are disposed substantially at right angles to the vertical plane but at an acute angle with the horizontal plane. Similarly the end portions 25 and 26 of the tie bar 22 are bent in the same degree as that of the ends 23 and 24 and so as to lie flat upon the turned back ends 23 and 24.

As best shown in Figures 3 and 4, these overlapped ends of the impact bar sections and the tie-bar are clamped together and to the corresponding end of the adjacent brace 18—19. This clamping action is effected by means of a pair of angular clamps 27 and 28 for the impact bar sections 10 and 11 respectively. Each of these clamps 27—28 is held in place by means of bolts 29 and clamping plates 30 disposed behind the corresponding impact bar section. These clamps 27 and 28 are inclined in opposite directions and serve to define the gap 12 between the impact bar sections 10 and 11 and cause colliding objects to glance off.

It should further be noted that the tie bar 22 is disposed substantially at right angles to the plane of the impact bar sections 10 and 11 and enables this bar to materially enhance the strength of the bumper as well as to maintain the impact bar sections 10 and 11 in proper longitudinal alignment. This tie bar 22 is disposed between the lower edges of the impact bar sections 10 and 11 as best shown in Figure 2 and is slightly bowed in shape so as to afford very little obstruction to the front view of the radiator which is visible through the gap 12 between the impact bar sections 10 and 11.

Of course, it is evident that the spaced impact bar sections 10 and 11 afford ample protection for the automobile opposite the fenders of the same, it being at the same time understood that such protection is not so necessary at the center of the bumper as at the portions opposite the fenders.

Now, we desire it understood that while we have illustrated and described in detail the preferred embodiments of this invention, the invention is not to be thus limited but only insofar as defined by the scope and spirit of the appended claims.

We claim as our invention:

1. In an automobile, impact bar sections with a central gap between them to afford a more extensive front view of the automobile radiator, said sections being in substantially a vertical plane, and a relatively narrow tie bar between said sections and bridging said gap, said tie bar being flat and having its flat sides in substantially a horizontal plane.

2. In a bumper for the front of an automobile, impact sections spaced apart at the center of the bumper so as to provide a central gap between said sections whereby a minimum amount of obstruction to a view of an automobile radiator is afforded, and means tying the sections together disposed between the lower edges of the sections and at right angles to the plane of the impact sections.

3. In a bumper for the front of an automobile, impact sections spaced apart at the center of the bumper so as to provide a central gap between said sections whereby a minimum amount of obstructions to a view of an automobile radiator is afforded, and means tying the sections together disposed between the lower edges of the sections, said tying means being bowed downwardly beyond the plane of the lower edges of the impact sections.

4. In an automobile, impact bar sections with a central gap between them to afford a more extensive front view of the automobile radiator, a relatively narrow impact and tie bar between and forming substantially a continuation of the lower edges of the impact surfaces of said sections, and means including clamps shielding the junctures of said sections and tie bar and securing the same together and defining the extremities of said gap.

5. In an automobile, impact bar sections with a central gap between them to afford a more extensive front view of the automobile radiator, a relatively narrow impact and tie bar between and forming substantially a continuation of the lower edges of the impact surfaces of said sections, and means including clamps shielding the junctures of said sections and tie bar and securing the same together and defining the extremities of said gap, said clamps being upwardly and outwardly inclined to cause colliding objects to glance off and so as to materially enhance the view of the radiator afforded through said gap.

HERBERT S. JANDUS.
BLADEN M. SHORT.